(12) United States Patent
Miller et al.

(10) Patent No.: US 10,279,570 B2
(45) Date of Patent: May 7, 2019

(54) COMPOSITE MATERIALS WITH MULTILAYER LAMINATE FACING

(71) Applicants: Thomas Miller, Granville, OH (US); Timothy Johnson, Dayton, OH (US)

(72) Inventors: Thomas Miller, Granville, OH (US); Timothy Johnson, Dayton, OH (US)

( * ) Notice: Subject to any disclaimer, the term of this patent is extended or adjusted under 35 U.S.C. 154(b) by 0 days.

(21) Appl. No.: 14/185,655

(22) Filed: Feb. 20, 2014

(65) Prior Publication Data

US 2018/0022074 A1    Jan. 25, 2018

(51) Int. Cl.
*B32B 5/02* (2006.01)
*B32B 7/12* (2006.01)
*B32B 27/12* (2006.01)

(52) U.S. Cl.
CPC .............. *B32B 27/12* (2013.01); *B32B 5/022* (2013.01); *B32B 7/12* (2013.01); *B32B 2607/00* (2013.01)

(58) Field of Classification Search
CPC ..... B32B 2607/00; B32B 27/12; B32B 5/022; B32B 7/12; B32B 2260/00; B32B 2260/021; B32B 2260/025; D04H 13/002; Y10T 442/2016
See application file for complete search history.

(56) References Cited

U.S. PATENT DOCUMENTS

| 2007/0000091 A1* | 1/2007 | Priegelmeir | B32B 1/04 16/372 |
| 2008/0045101 A1* | 2/2008 | Near | B32B 5/26 442/35 |

FOREIGN PATENT DOCUMENTS

WO    WO-2013144421 A1 *  10/2013  ............. B29C 47/04

* cited by examiner

*Primary Examiner* — Elizabeth M Cole
(74) *Attorney, Agent, or Firm* — Wood Herron & Evans LLP (57) ABSTRACT

A composite board with a multilayer laminated facer is presented having a nonwoven, a first polymer layer, and a second polymer layer. The laminate may be printed on the nonwoven, on the upper surface of the first polymer layer or inverted printed on the backside of an applied film. A number of configurations for the polymer layers are disclosed. The laminate may include exposed fibers on the lower surface or the nonwoven may be saturated. A removable peel-ply may be included. By controlling the placement and thickness of the polymer layers it is possible to tailor additive in the polymers such as colorants, opacifiers, UV stabilizers, and fire retardants to improve quality and reduce costs. In an alternate embodiment of the present invention, a first polymer layer is applied to the topside of the nonwoven and the second polymer is laminated to the first polymer layer as a preformed film. The laminated facer is thermally or adhesively bonded to the composite board.

10 Claims, 12 Drawing Sheets

COMPOSITE MATERIALS WITH MULTILAYER LAMINATE FACING

CLAIM OF PRIORITY

This application is a Continuation-In-Part of U.S. provisional Patent Application Ser. No. 61/766,946 filed Feb. 20, 2013. All information contained in the 61/766,946 is hereby incorporated by reference.

BACKGROUND

The present invention relates to composite material formed of a fiber reinforced polymer matrix material having a multilayer laminate surface, such as fiberglass reinforced composite panels. One such panel is a structural fiberglass reinforced polypropylene panel that is useful as truck liners for use in the transportation industry. A structural fiberglass reinforced polypropylene panel material may also be useful in clean rooms used in semiconductor and other manufacturing, operating rooms or food preparation sites.

SUMMARY

In accordance with embodiments the present invention relates to multilayer laminate facings for fiber reinforced or composite materials and materials formed therefrom. The present invention relates to a composite board with a multilayer laminated facer is presented having a nonwoven, a first polymer layer and a second polymer layer. The laminate may be printed on the nonwoven, on the upper surface of the first polymer layer or inverted printed on the backside of an applied film. A number of configurations for the polymer layers are disclosed. The laminate may include exposed fibers on the lower surface or the nonwoven may be saturated. A removable peel-ply may be included. By controlling the placement and thickness of the polymer layers, it is possible to tailor additive in the polymers such as colorants, opacifiers, UV stabilizers, and fire retardants to improve quality and reduce costs. In an alternate embodiment of the present invention, a first polymer layer is applied to the topside of the nonwoven and the second polymer is laminated to the first polymer layer as a preformed film. The laminated facer is thermally or adhesively bonded to the composite board.

BRIEF DESCRIPTION OF THE DRAWINGS

A more complete appreciation of the invention and the many embodiments thereof will be readily obtained as the same becomes better understood by reference to the following detailed description when considered in connection with the accompanying drawings, wherein.

DETAILED DESCRIPTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

Fibrous nonwoven webs provide a substrate carrier to support an extruded polymer layer. Nonwoven webs may be formed from a number of processes including, spunbond or meltblown. Spunbond fibers are formed by extruding a molten thermoplastic material from capillaries in a spinneret and being reducing the diameter by mechanical or fluid-drawing. Meltblown fibers are formed by extruding molten thermoplastic material through a plurality of fine, usually circular, die capillaries as molten threads or filaments into a high velocity gas stream to attenuate the fibers. The web may be bonded to improve mechanical properties. Many bonding methods are available including powder bonding using a powdered adhesive added to the web and then typically heated. Another bonding method is point or pattern bonding using heated calender rolls or ultrasonic bonding equipment to bond the fibers together. Roll bonding may be used to bond the web across its entire surface. Point bonding is generally preferred in these materials, as it bonds firmly to the polymer in places and leaves fibers available to be commingled with the composite laminate or coating resin. Mono-component, multi-component or combinations of these fibers of different compositions or combinations may be used in the process as well.

Figure 1A:
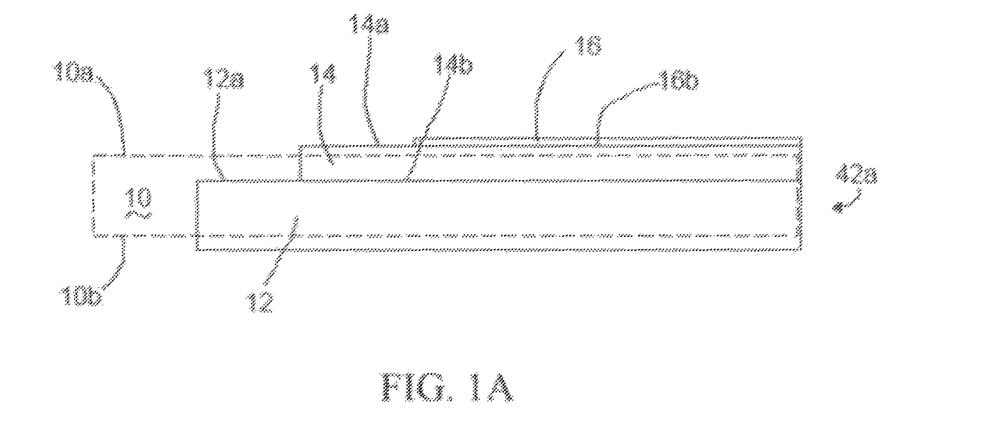
FIG. 1A illustrates a section view of the formation of a multilayered laminate material of one aspect of the present invention.

As shown in FIG. 1A, a non-woven material 10 having an upper surface 10a and a lower surface 10b is printed on upper surface 10a in a standard industry process and receives a first backside coating of a polymer layer 12 to form a preliminary laminate material. In FIG. 1A, the polymer layer 12 is applied to the lower surface 10b and passed through a nip such that the first coating 12 does not completely penetrate the non-woven so that the upper surface 12a of first polymer layer 12 is free of fibers and the printed side 10a of non-woven 10 is uncoated. The preliminary laminate may receive a corona discharge treatment to change the surface energy of the polymer layer 12 or the non-woven material 10 in preparation for further processing. A second polymer layer 14 is applied atop the upper surface 10a of the nonwoven 10 and a protective film 16 may be applied to the top surface 14a of second polymer layer 14 to form laminate 42a. As shown in FIG. 1A, the interface between the top surface 12a of first polymer 12 and the lower surface 14b second layer 14 is within the nonwoven material 10. In one preferred embodiment of the invention, the first polymer 12 would be relatively opaque and the second polymer 14 atop the graphic printing would be relatively translucent.

Figure 1B:
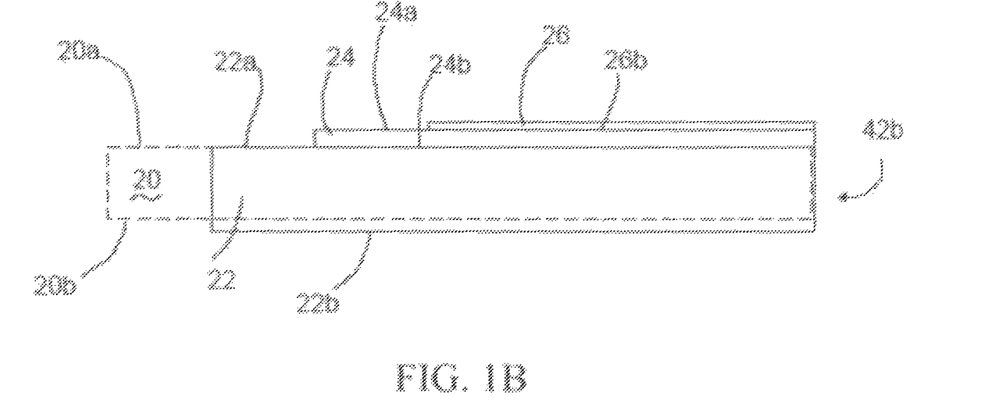
FIG. 1B illustrates a section view of the formation of a multilayered laminate material of another aspect of the present invention.

FIG. 1B, shows a non-woven material similar to that of FIG. 1A with a coating of a first polymer layer 22 on the lower surface 20b of non-woven 20 to form a preliminary laminate material. The first polymer layer 22 is applied to the non-printed side 20b and passed through a nip such that the first coating completely penetrates non-woven 20 so that the lower surface 22b of first polymer layer 22 is free of fibers and the printed side 20a of non-woven 20 is coated such that the upper surface 20a of the non-woven and the upper surface 22a of first polymer layer 22a are roughly even. The preliminary laminate may receive a corona discharge treatment to change the surface energy of the polymer layer 22 or the non-woven 20 in preparation for further processing. Alternatively, the upper surfaces 20a, 22a (which are generally coplanar), may be printed in a standard industry process subsequent to the application of the first polymer coat 22. A second polymer layer 24 is applied such that the lower surface 24 contacts the upper surface 22a of first polymer layer 22. A protective film 26 may be applied such that the lower surface 26b contacts upper surface 24a of second polymer layer 24 to form laminate 42b. As seen in FIG. 1A and FIG. 1B the placement and the thicknesses of the two coating layers may be altered. As shown in FIG. 1B, the interface between the first and second polymers is at the upper surface 20a of the nonwoven.

Figure 1C:
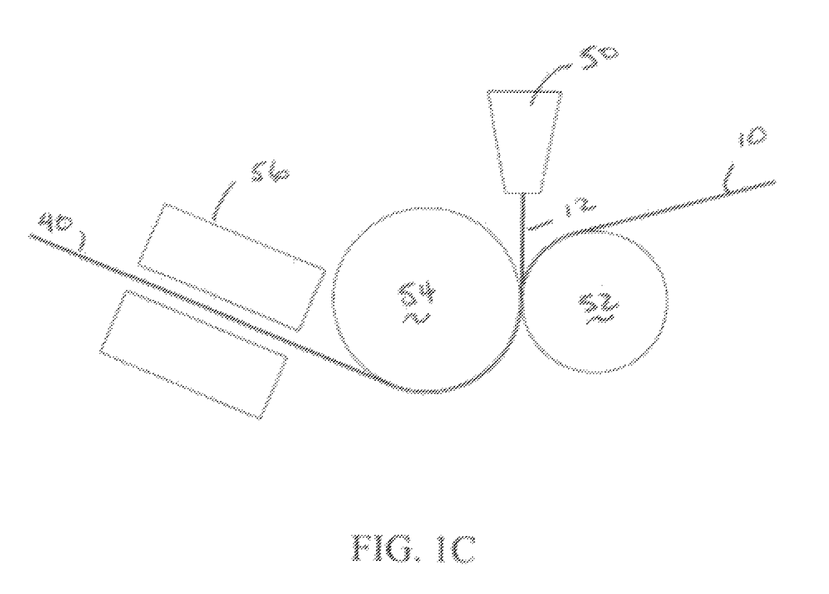
FIG. 1C illustrates a first pass backside coating process showing an optional preprinting or post-printing step suitable for use in the manufacture of the multilayered laminate material of the present invention.

FIG. 1C shows the first backside coating process in which the first polymer layer 12 is applied to non-woven 10. Non-woven 10 may be non-printed or preprinted in this process or printing may be performed after the application process. The pressure of nip rollers 52, 54 may be controlled to vary the depth of penetration of polymer 12 into non-woven 10. A high pressure results in the preliminary laminate shown in FIG. 1B while a lower pressure results in the preliminary laminate shown in FIG. 1A. As shown, the preliminary laminate 40 may receive a corona discharge treatment 56 in preparation for further processing.

Figure 1D:
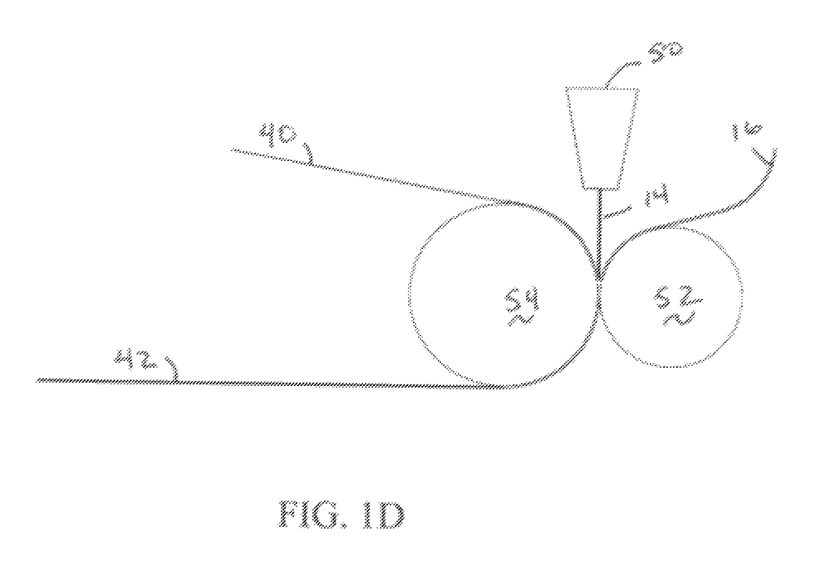
FIG. 1D illustrates a second pass topside coating process suitable for use in the manufacture of the multilayered laminate material of the present invention.

FIG. 1D shows the process of forming the laminate 42 (which may be in the form of 42a or 42b based on processing parameters such as nip pressure) shown in FIG. 1A in which non-woven 10 may be preprinted before inclusion in the preliminary laminate 40, or according to FIG. 1B in which the non-woven 10 may be printed after the first coating step.

The preliminary laminate 40 is fed into nip rollers 52, 54 with a second polymer coating 14 fed between the topside of the preliminary laminate 40 and a film 16. Film 16 may be a peel-ply that is used to protect the upper surface 14a of the second polymer 14 during processing and finish lamination to a composite material. The laminate material 42 formed has a non-woven layer 10 with a upper surface 10a, which may be printed, and a first polymer coating 12 applied to the lower surface 10b and a second polymer 14 with a peel-ply film 16 on the upper surface 10a of nonwoven 10. The laminate 42 is typically rolled and shipped and/or stored for further processing.

Figure 1E:
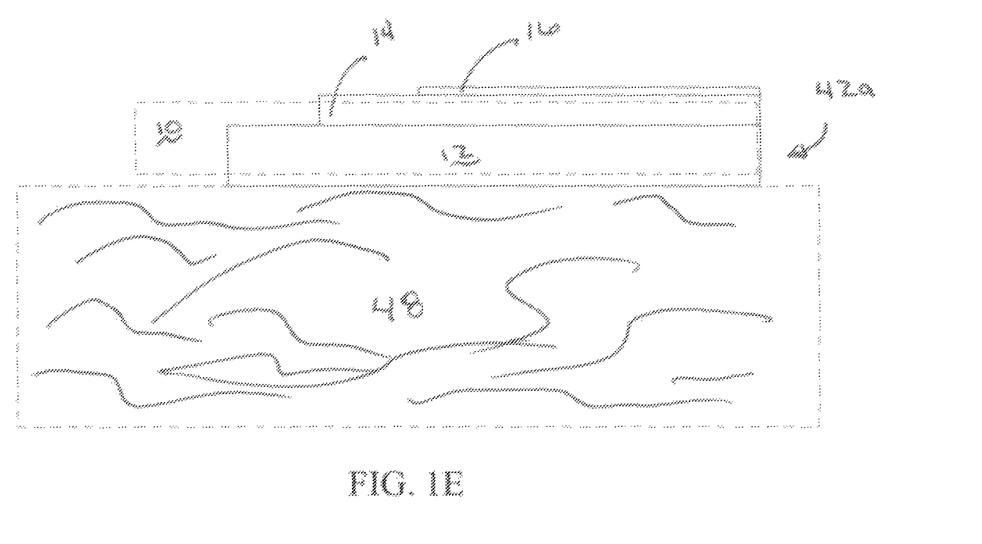
FIG. 1E illustrates a section view of a multilayered laminate material according to FIG. 1A on a composite panel of the present invention.

In FIG. 1E the multilayer laminate 42a of FIG. 1A is thermally laminated to a fiber reinforced composite material 48 to provide structural materials with high quality surface finishing for superior appearance and environmental resistance. The laminate includes a non-woven web 10, first polymer layer 12, second polymer layer 14 and a film 16. The first polymer 12 on the backside of laminate 42a is generally compatible with the polymer of the fiber reinforced composite panel 48 to securely bond the laminate material to the panel. The panel is typically formed of a polymer and fibers such as glass fibers, carbon fibers, polymer fibers, polyamide fibers, aramid fibers, natural fibers and combinations thereof. The multilayer laminate material is generally thermally laminated to fiber reinforced composite materials to provide structural materials with high quality surface finishing for superior appearance and environmental resistance.

Figure 1F:
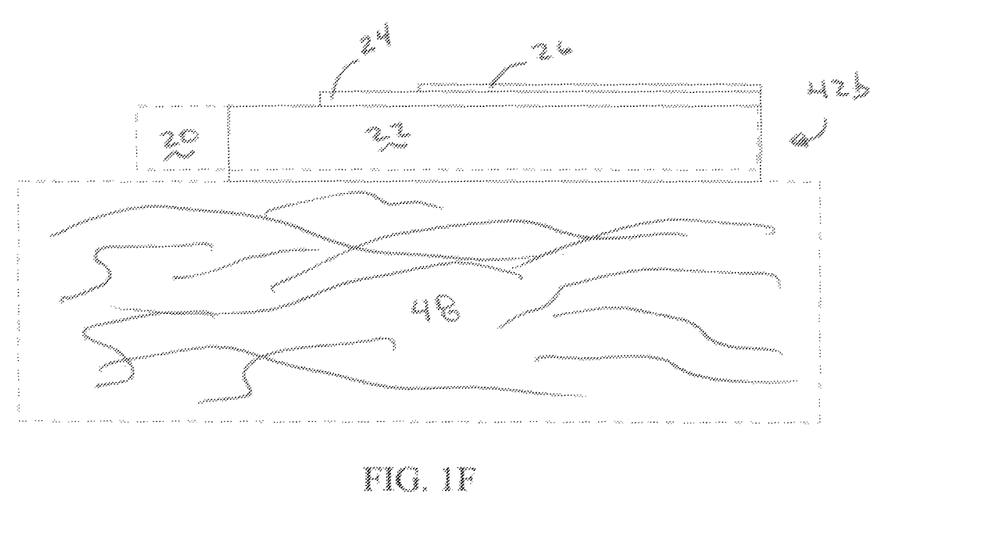
FIG. 1F illustrates a section view of a multilayered laminate material according to FIG. 1B on a composite panel of the present invention.

In FIG. 1F the multilayer laminate material 42b of FIG. 1B is thermally laminated to fiber reinforced composite materials 48 to provide structural materials with high quality surface finishing for superior appearance and environmental resistance. The laminate includes a non-woven web 20, first polymer layer 22, second polymer layer 24 and a film 26. The first polymer layer 22 on the backside of laminate 42b is generally compatible with the polymer of the fiber reinforced composite panel 48 to securely bond the laminate material to the panel. In addition, the multilayer laminate 42b provides sufficient polymer 22 to fill surface imperfections of fiber reinforced composite panel 48 to improve surface quality. The first polymer layer 22 may be blended to become relatively opaque so the multilayer laminate 42b is able to optically cover variations that may be present in the reinforced composite panel 48, and second polymer layer 24 atop the graphic printing is blended to become relatively translucent so the image quality and color retention of the printing is maximized and protected.

Figure 2A:
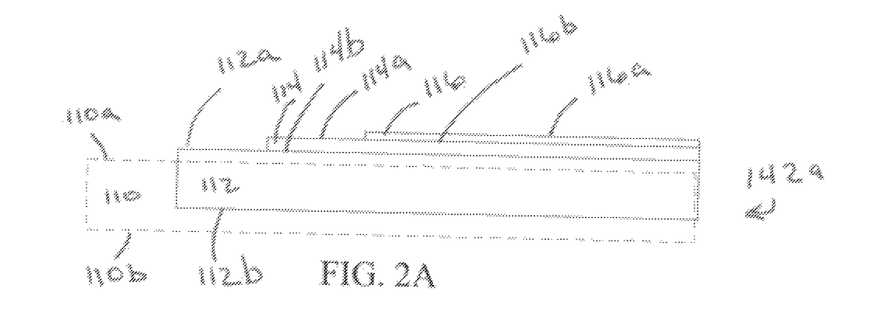
FIG. 2A illustrates a section view of the formation of a multilayered laminate material of another aspect of the present invention.

As shown in FIG. 2A, a non-woven material 110 having an upper surface 110a and a lower surface 110b. In FIG. 2A, the first polymer layer 112 is applied to the upper surface 120a and passed through a nip such that the first polymer layer 112 does not completely penetrate non-woven 112 so that the lower surface 110b is not fully saturated with first polymer layer 112, i.e. lower surface 112b is located within non-woven 110 and some fibers remain exposed on lower surface 110b. The laminate 142a may be printed in a standard industry process and receives a second polymer layer 114. The lower surface 114b of second polymer layer 114 contacts upper surface 112a of first polymer layer 112. The printing may be applied to the upper surface 110a prior to coating, applied to the upper surface 112a of first polymer layer 112 after coating or may remain unprinted. The preliminary laminate 142a may receive a corona discharge treatment to change the surface energy of the polymer layer 112 or non-woven 110 in preparation for further processing. A second polymer layer 114 is applied to first polymer layer 112 on upper side 112a of first polymer layer 112 that is above the upper surface 110a of nonwoven 110 resulting in a fiber free upper surface 112a, to improve the surface features of laminate 142a. A protective film 116 may be applied such that film lower surface 116b contacts upper surface 114a of second polymer layer 114. The upper surface 116a of film 116 protects laminate 142a during subsequent processing. The exposed fibers on the lower surface 110b of non-woven 110 provide bonding sites to form a mechanical bond with the polymer of a composite panel 150 (as shown in FIG. 2F). Mechanical bonding with the exposed fibers may be beneficial in the manufacture of composite panels with a thermoset matrix, an adhesive layer, or a polymer, which is incompatible with the polymer of the laminate material.

Figure 2B:
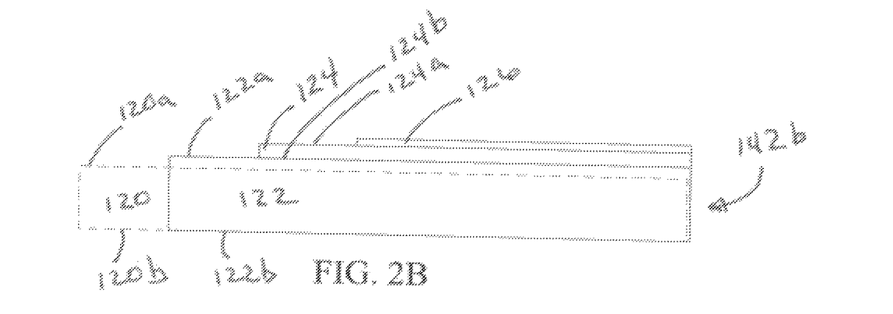
FIG. 2B illustrates a section view of the formation of a multilayered laminate material of another aspect of the present invention.

FIG. 2B, shows a laminate material 142b similar to that of FIG. 2A with the first lower face 122b of polymer layer 122 applied to the upper surface 120a of non-woven 120. The non-woven 120 may be printed or the upper surface 122a of first polymer layer 122 may be subsequently printed or may remain unprinted. The nonwoven 120 and first polymer layer 122 are passed through a nip such that the first polymer layer 122 completely penetrates non-woven 120 so that the lower surface 122b of first polymer layer 122 is generally free of fibers. A second polymer layer 124 is applied atop first polymer layer 122 such that lower surface 124b contacts upper surface 122a of first polymer layer 122 and a protective film 126 may be applied to upper surface 124b of second polymer layer 124. As shown in FIG. 2B, the interface between first polymer layer 122 and second polymer layer 124 is above the upper surface 120a of nonwoven 120.

Figure 2C:
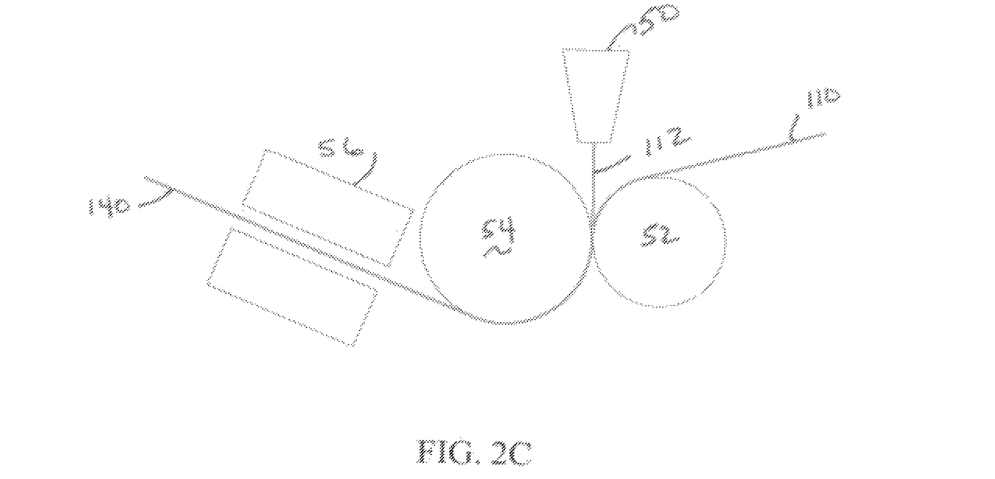
FIG. 2C illustrates a first pass topside coating process showing an optional preprinting or post-printing step suitable for use in the manufacture of the multilayered laminate material of the present invention.

FIG. 2C shows the first pass coating in which the first polymer layer 112 is applied. The non-woven 110 may be preprinted in this process or printing may be performed after the application process. Non-woven 110 and first polymer layer 112 are passed between nip rolls 52, 54. The pressure at the nip may be controlled to form the precursor 140 for the laminate of FIG. 2A or increased to form the laminate of FIG. 2B, as shown, the preliminary laminate may receive a corona discharge 56 treatment in preparation for subsequent printing.

Figure 2D:
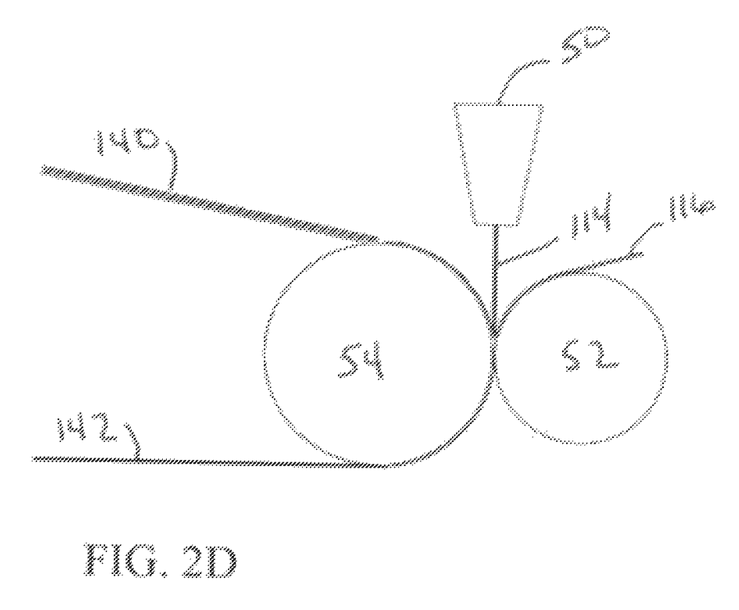
FIG. 2D illustrates a second pass coating process on an optionally printed nonwoven suitable for use in the manufacture of the multilayered laminate material of the present invention.

FIG. 2D shows the process of forming the laminate shown in FIG. 2A or FIG. 2B. The preliminary laminate 140 is fed into nip rollers 52, 54 with second polymer layer 114 fed between preliminary laminate 140 and film 116. The backside of laminate 142 have exposed fibers, as shown in FIG. 2A (as 142a) or may be saturated as shown in FIG. 2B (as 142b). The laminate 142 is typically rolled and shipped and/or stored for further processing.

Figure 2E:
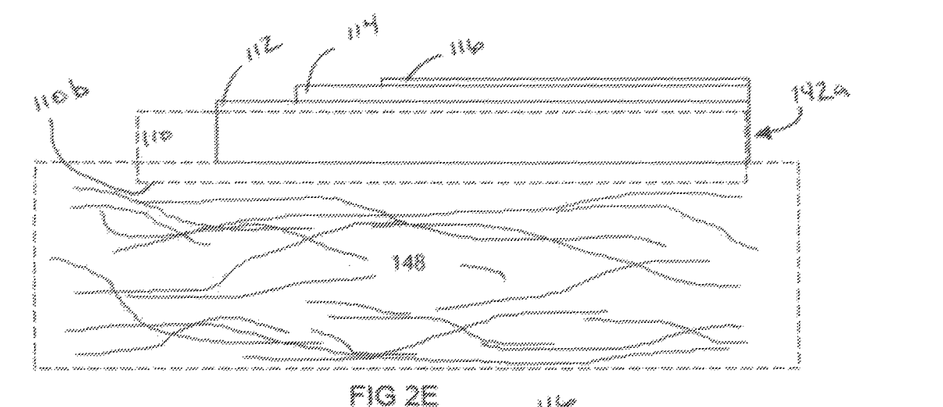
FIG. 2E illustrates a section view of a multilayered laminate material according to FIG. 2A on a composite panel of the present invention.
Figure 2F:
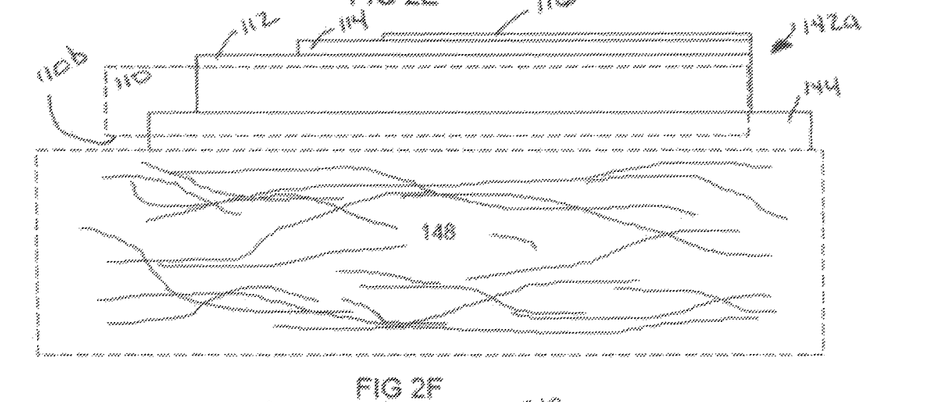
FIG. 2F illustrates a section view of a multilayered laminate material according to FIG. 2A with a supplemental adhesive on a composite panel of the present invention.

In FIG. 2E the multilayer laminate material 142a of FIG. 2A is thermally laminated to a fiber reinforced composite material 148 to provide a structural material with high quality surface finishing for superior appearance and environmental resistance. The free fibers on the lower face 110b of non-woven 110 are saturated with the polymer of the fiber reinforced composite panel 148 to securely bond laminate material 142a to panel 148. The second polymer layer 114 and film 116 present and protect the appearance of the composite material.

In FIG. 2F the multilayer laminate material 142a of FIG. 2A is laminated to a fiber reinforced composite material 148 to provide a structural material with high quality surface finishing for superior appearance and environmental resistance. The free fibers on the lower face 110b of non-woven 110 are saturated with an adhesive 144 and adhesively bonded to the fiber reinforced composite panel 148. The second polymer layer 114 and film 116 present and protect the appearance of the composite material.

Figure 2G:
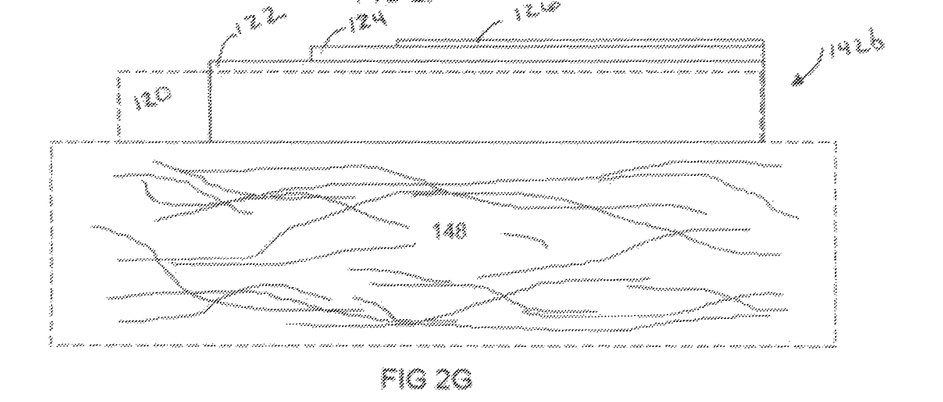
FIG. 2G illustrates a section view of a multilayered laminate material according to FIG. 2B on a composite panel of the present invention.

In FIG. 2G the multilayer laminate material 142b of FIG. 2B is thermally to a fiber reinforced composite material 148 to provide a structural material with high quality surface finishing for superior appearance and environmental resistance. The non-woven 120 carries the first polymer layer 122, which is compatible with the polymer of the fiber reinforced composite panel 148 to securely bond the laminate material 142b to the panel 148. The second polymer layer 124 and film 126 present and protect the appearance of the composite material.

Figure 3A:
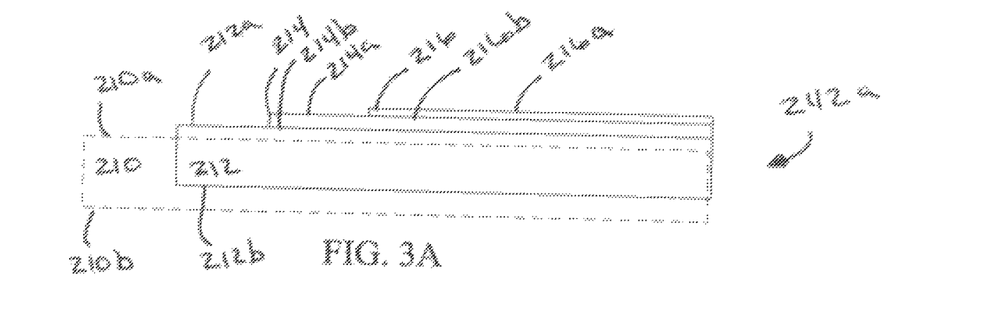
FIG. 3A illustrates a section view of the formation of a film coated multilayered laminate material of one aspect of the present invention.

As shown in FIG. 3A, the upper surface 210a of a non-woven material 210 receives a coating of a second polymer layer 212. A first polymer layer 214 is preapplied to the lower face 216b film 216 and is subsequently applied to the upper face 212a of second polymer 212. The upper surface 214a of first polymer layer 214 is high quality as it is formed on film 226. The laminate of film 226 and first polymer layer 214 may be formed in a separate process step as shown in FIG. 3C or may be formed in an inline process before applied to the upper surface 212a of second polymer layer 212. Non-woven 210 may be printed on the upper surface 210a prior to lamination or lower surface 214b of first polymer layer 224 may be reverse printed before it is applied. Non-woven 210 is passed through a nip such that the lower surface 212b of second polymer 212 does not completely penetrate non-woven 210 so that the lower surface 210b is not saturated with the second polymer layer 212 and exposed fibers remain on the lower surface 210b. The second polymer layer 212 bonds to first polymer layer 214 on film, and provides an improved surface of the laminate 242a. As shown in FIG. 3A, the interface between the first polymer layer 214 and second polymer later 212 is above the upper surface 210a of nonwoven 210. The film layer 216 is generally a peel ply that remains on the laminate 242a during processing such that upper surface 216a protects the material and may be removed by the end user. The exposed fibers on the lower side 210b of non-woven 210 may provide bonding sites to form a mechanical bond with the polymer of a composite panel. Mechanical bonding with the exposed fibers may be beneficial in the manufacture of composite panels with a thermoset matrix, an adhesive layer, or a polymer, which is incompatible with the polymer of the laminate material.

Figure 3B:
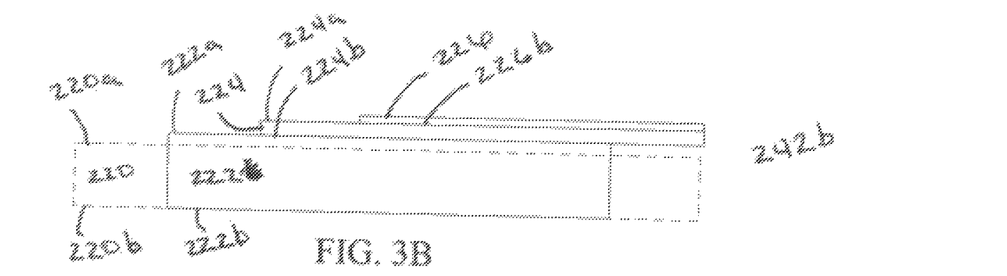
FIG. 3B illustrates a section view of the formation of a film coated multilayered laminate material of another aspect of the present invention.
Figure 3C:
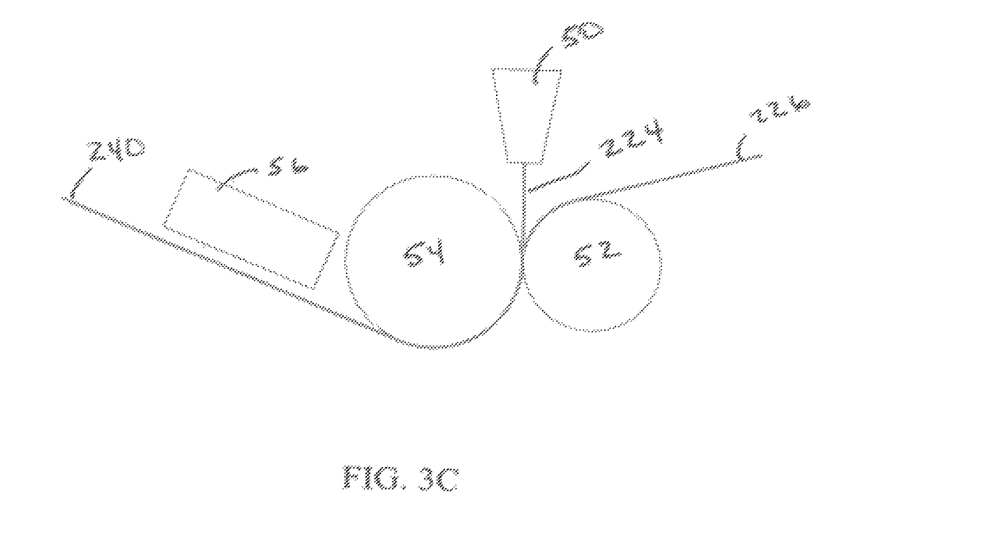
FIG. 3C illustrates a first pass coating process showing an optional post-printing step suitable for use in the manufacture of the multilayered laminate material of the present invention.

As shown in FIG. 3B the upper surface 220a of a non-woven material 220 receives a coating of a second polymer layer 222. A first polymer layer 224 is preapplied to the lower face 226b film 226 and is subsequently applied to the upper face 222a of second polymer 222. The upper surface 224a of first polymer layer 224 is high quality as it is formed on film 226. The laminate of film 226 and first polymer layer 224 may be formed in a separate process step as shown in FIG. 3C or may be formed in an inline process before applied to the upper surface 222a of second polymer layer 222. Non-woven 220 may be printed on the upper surface 220a prior to lamination or lower surface 224b of first polymer layer 224 may be reverse printed before it is applied. Non-woven 220 is passed through a nip such that the lower surface 222b of second polymer 222 penetrate non-woven 220 so that the lower surface 220b is saturated with the second polymer layer 222 and no exposed fibers remain on the lower surface 220b. The second polymer layer 222 bonds to first polymer layer 224 on film, and provides an improved surface of the laminate 242a. As shown in FIG. 3A, the interface between the first polymer layer 224 and second polymer later 222 is above the upper surface 220a of nonwoven 220. The film layer 226 is generally a peel ply that remains on the laminate 242b during processing and may be removed by the end user. The lower surface 222b of second polymer 222 provides bonding to form a chemical bond with the polymer of a composite panel. As shown in FIG. 3B, the interface between the first and second polymers is above the topside surface of the nonwoven.

FIG. 3C shows the first polymer layer 224 on film 226 that is subsequently applied to the second polymer layer 224. The film 226 is fed between nip rollers 52, 54 and first polymer layer 224 is extruded from extruder 50 into the nip to form precursor laminate 240. The precursor laminate may be corona treated and may optionally be reverse printed on the lower surface 224b of first polymer 224.

Figure 3D:
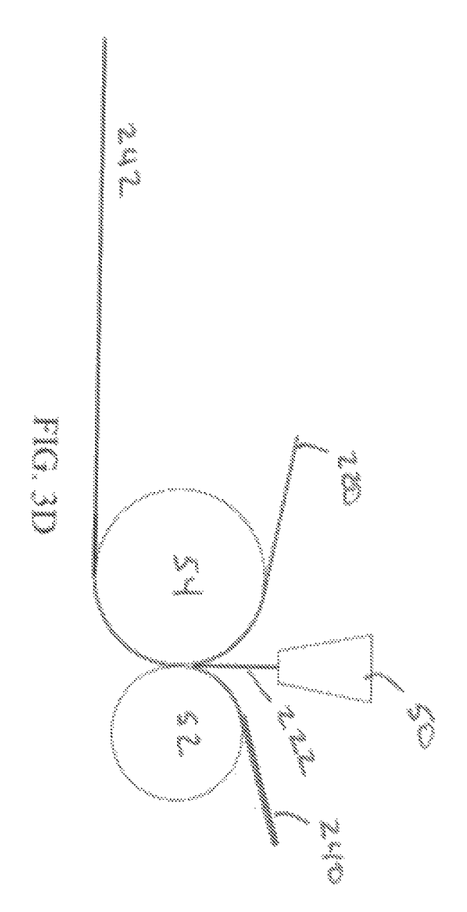
FIG. 3D illustrates a second pass coating process suitable for use in the manufacture of the multilayered laminate material of the present invention.

FIG. 3D shows the process of forming a laminate 242 in which nonwoven 220 may optionally be preprinted before inclusion in laminate 242. The nonwoven 220 is fed into nip rollers 52, 54 with a second polymer layer 222 fed between nonwoven 220 and the precursor laminate 240 as formed in FIG. 3C. The laminate material shown 242 is formed with a non-woven layer 220 with an optionally printed surface. Typically if an unprinted non-woven 220 is used the precursor laminate is reverse printed. As seen in FIG. 3A and FIG. 3B, the lower surface 210b of nonwoven 210 may be substantially free of fibers or may have exposed fibers based on the amount of second polymer 222 used and the pressure between the nip rollers 52, 54. The laminate 242 is typically rolled and shipped and/or stored for further processing.

Figure 3E:
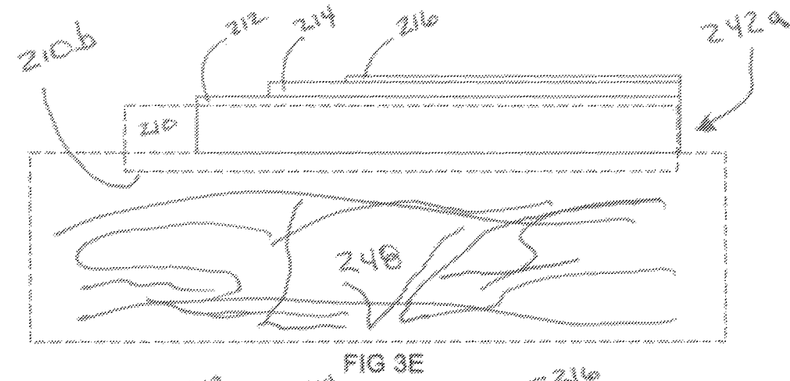
FIG. 3E illustrates a section view of a multilayered laminate material according to FIG. 3A on a composite panel of the present invention.

In FIG. 3E the multilayer laminate material 242a of FIG. 3A is thermally laminated to a fiber reinforced composite material 248 to provide a structural material with high quality surface finishing for superior appearance and environmental resistance. The free fibers on the lower face 210b of non-woven 210 are saturated with the polymer of the fiber reinforced composite panel 248 to securely bond laminate material 242a to panel 148. The second polymer layer 214 and film 216 present and protect the appearance of the composite material.

Figure 3F:
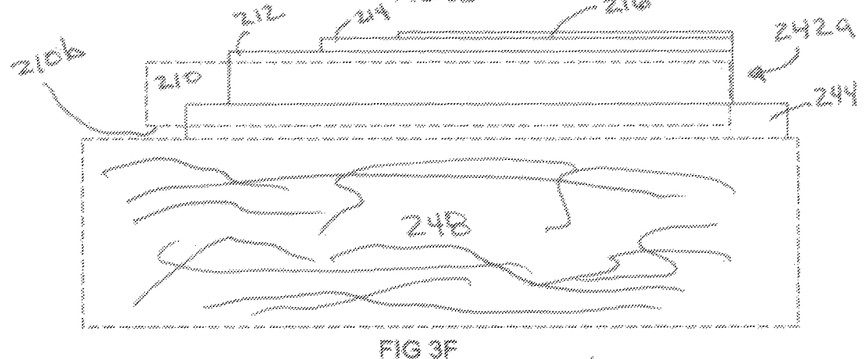
FIG. 3F illustrates a section view of a multilayered laminate material according to FIG. 3A with a supplemental adhesive on a composite panel of the present invention.

In FIG. 3F the multilayer laminate material 242a of FIG. 3A is laminated to a fiber reinforced composite material 248 to provide a structural material with high quality surface finishing for superior appearance and environmental resistance. The free fibers on the lower face 110b of non-woven 210 are saturated with an adhesive 244 and adhesively bonded to the fiber reinforced composite panel 248. The second polymer layer 214 and film 216 present and protect the appearance of the composite material.

Figure 3G:
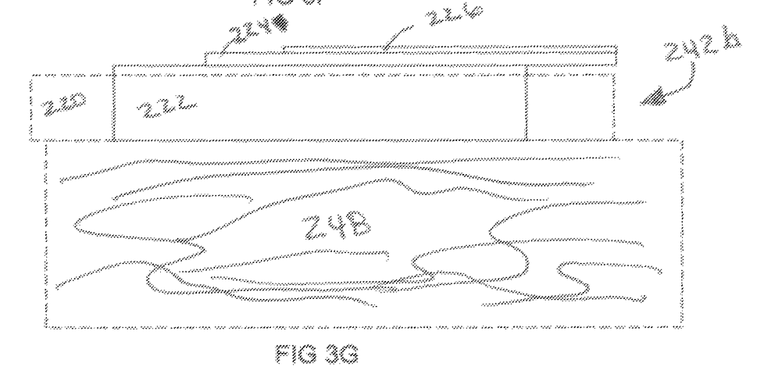
FIG. 3G illustrates a section view of a multilayered laminate material according to FIG. 3B on a composite panel of the present invention.

In FIG. 3G the multilayer laminate material 242b of FIG. 3B is thermally to a fiber reinforced composite material 248 to provide a structural material with high quality surface finishing for superior appearance and environmental resistance. The non-woven 220 carries the first polymer layer 222, which is compatible with the polymer of the fiber reinforced composite panel 248 to securely bond the laminate material 242b to the panel 248. The second polymer layer 224 and film 226 present and protect the appearance of the composite material.

Figure 4A:
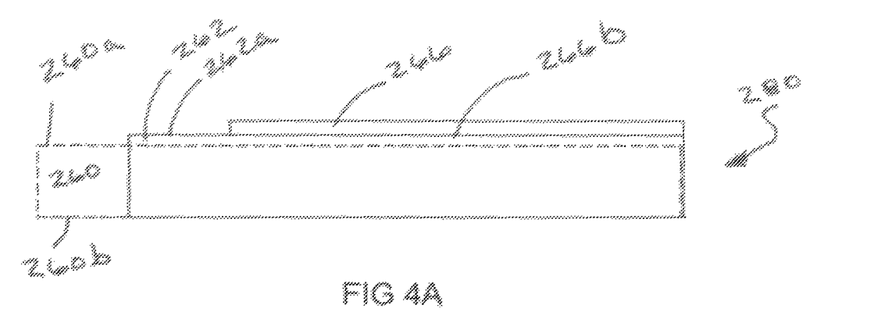
FIG. 4A illustrates a section view of the formation of a multilayered laminate material of one aspect of the present invention.

As shown in FIG. 4A, a non-woven material 260 receives a first polymer layer 262 on the upper surface 260a thereof with a film 266 applied to the upper surface 262a of first polymer layer 262. The upper surface 260a of nonwoven 260 may be printed prior to the lamination process. The nonwoven 260 is passed through a nip such that the first polymer layer 262 saturates non-woven 262 and such that the first polymer layer 262 is present on the lower surface 260b. The upper surface 260a of non-woven 260 may be printed, or alternatively, the lower surface 266b of second polymer layer 266 may be reverse printed prior to lamination.

Figure 4B:
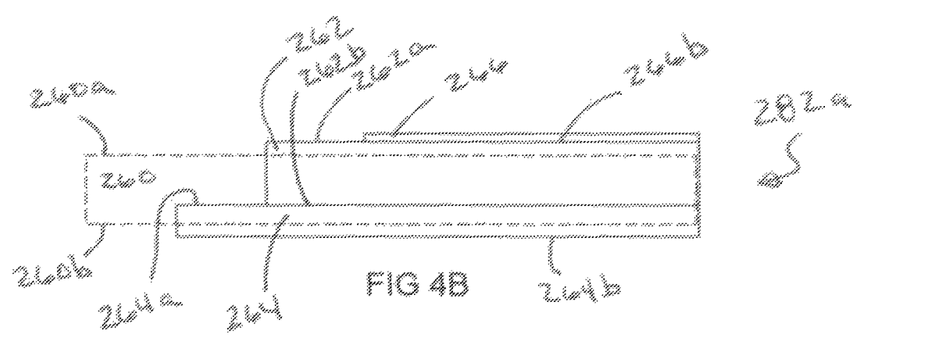
FIG. 4B illustrates a section view of the formation of a multilayered laminate material of one aspect of the present invention.

As shown in FIG. 4B, a non-woven material 260 receives a first polymer layer 262 on the upper surface 260a thereof with a film 266 applied to the upper surface 262a of first polymer layer 262. The lower surface 260b of the non-woven is coated with a second polymer layer 264 to form a laminate. The upper surface 260a of nonwoven 260 may be printed prior to the lamination process. The nonwoven 260 is passed through a nip such that the first polymer layer 262 does not completely saturate non-woven 262 and leaves exposed fibers on the backside 260b to bond with second polymer layer 264. The union between lower surface 262b of the first p [polymer layer 262 and the upper surface 264a is located within the thickness of the non-woven 260, the ratio of thickness of the two polymer layers 262, 264 may be altered based on the amounts of polymers used and the nip pressure. The lower face 264b of second polymer layer is substantially free of fibers.

Figure 4C:
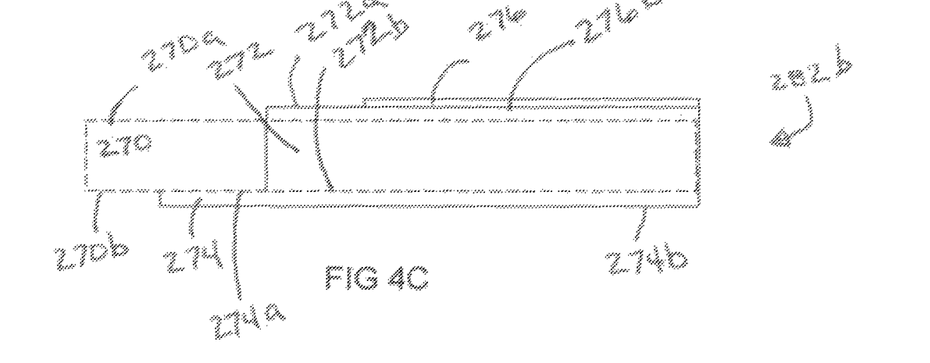
FIG. 4C illustrates a section view of the formation of a multilayered laminate material of another aspect of the present invention.

As shown in FIG. 4C, a non-woven material 270 receives a first polymer layer 272 on the upper surface 270a thereof with a film 276 applied to the upper surface 272a of first polymer layer 272. The lower surface 270b of the non-woven is coated with a second polymer layer 274 to form a laminate. The upper surface 270a of nonwoven 270 may be printed prior to the lamination process. The nonwoven 270 is passed through a nip such that the first polymer layer 272 does not completely saturate non-woven 272 and leaves exposed fibers on the backside 270b to bond with second polymer layer 274. The union between lower surface 272b of the first p [polymer layer 272 and the upper surface 274a is located at the lower surface 270b of the non-woven 270. The lower face 274b of second polymer layer is substantially free of fibers.

Figure 4D:
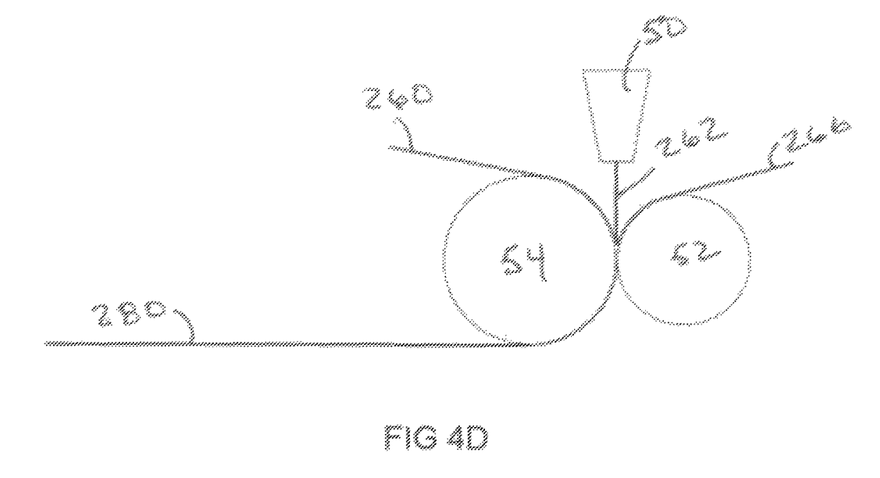
FIG. 4D illustrates a first pass coating process suitable for use in the manufacture of the multilayered laminate material of the present invention.

FIG. 4D shows the formation of a precursor laminate 280 for later use in manufacturing the laminate 282 of the present invention. The nonwoven 260 coated with a first polymer layer 262 with a film layer between nip rolls 52, 54. First polymer layer 262 is extruded from extruder 50 into the nip with film 266 and non-woven 260. The laminate precursor 280 output may be rolled for further processing or may have second polymer layer 274 applied in line.

Figure 4E:
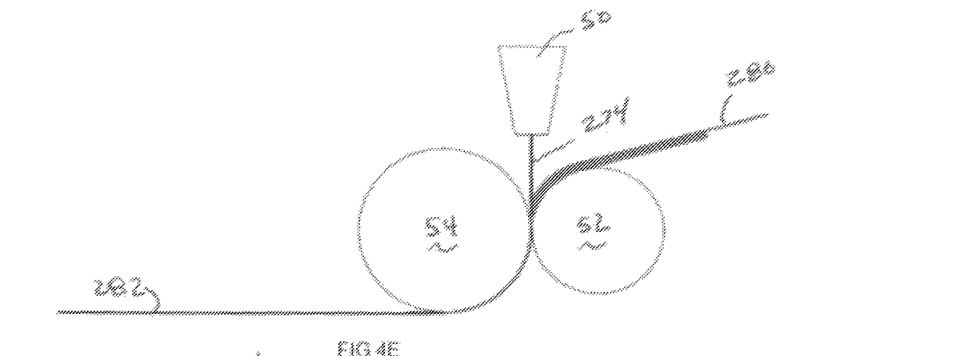
FIG. 4E illustrates a second pass coating process suitable for use in the manufacture of the multilayered laminate material of the present invention.

FIG. 4E shows the formation of laminate 282 of the present invention. The preliminary laminate 280 is coated with second polymer layer 264 between nip rolls 52, 54. Second polymer layer 264 is extruded from extruder 50 into the nip with precursor laminate 280. The laminate 282 output may be rolled and transported to a composite facility or further processed inline.

Figure 4F:
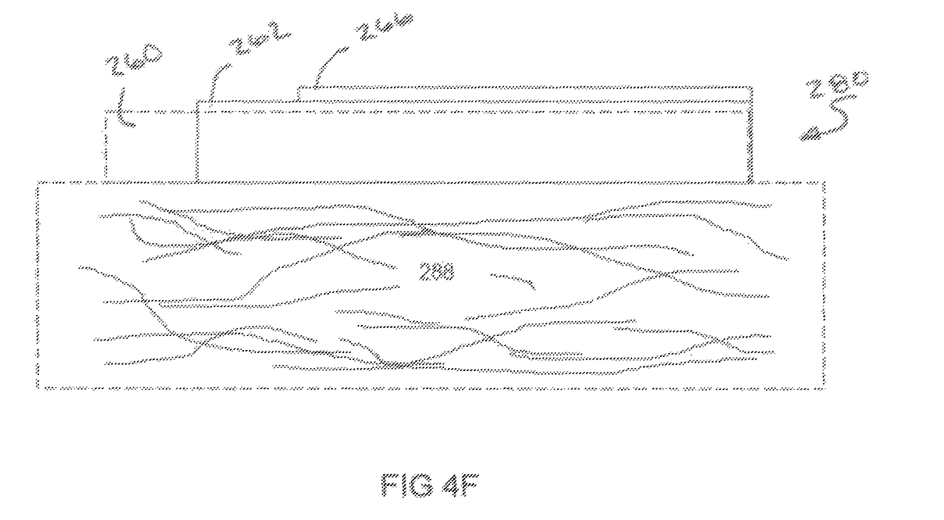
FIG. 4F illustrates a section view of a multilayered laminate material according to FIG. 4A on a composite panel of the present invention.

In FIG. 4F the multilayer laminate material of FIG. 4A is thermally laminated to fiber reinforced composite 288 to provide structural materials with high quality surface finishing for superior appearance and environmental resistance. Laminate 280 includes non-woven 260 first polymer layer 262, and a second polymer layer applied as a film layer 266. The first polymer layer 262 is generally compatible with the polymer of the fiber reinforced composite panel 288 to securely bond laminate 280 to panel 288.

Figure 4G:
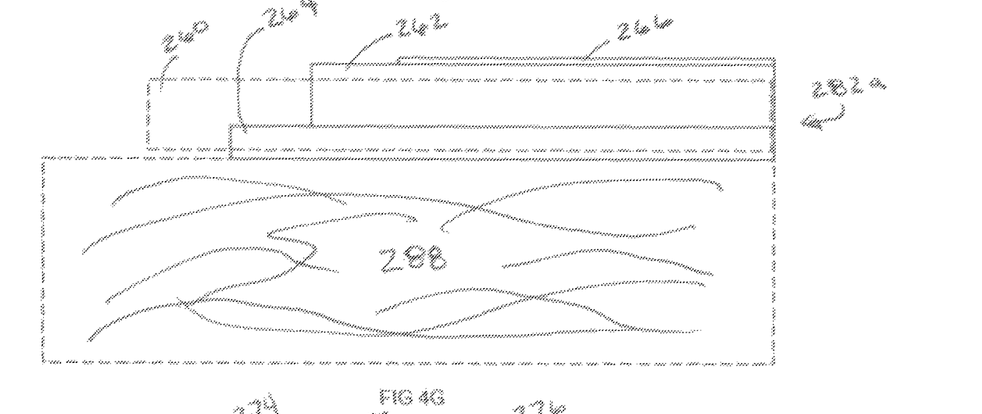
FIG. 4G illustrates a section view of a multilayered laminate material according to FIG. 4B on a composite panel of the present invention.

In FIG. 4G the multilayer laminate material of FIG. 4B is thermally laminated to fiber reinforced composite 288 to provide structural materials with high quality surface finishing for superior appearance and environmental resistance. Laminate 282a includes non-woven 260 first polymer layer 262, film layer 266 and second polymer layer 264. The second polymer layer 264 is generally compatible with the polymer of the fiber reinforced composite panel 288 to securely bond laminate 282a to panel 288.

Figure 4H:
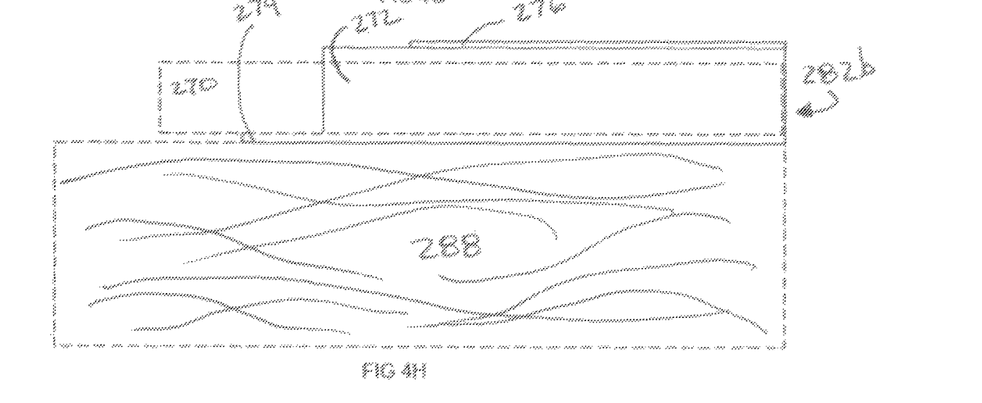
FIG. 4H illustrates a section view of a multilayered laminate material according to FIG. 4C on a composite panel of the present invention.

In FIG. 4H the multilayer laminate material of FIG. 4C is thermally laminated to fiber reinforced composite 288 to provide structural materials with high quality surface finishing for superior appearance and environmental resistance. Laminate 282a includes non-woven 270 first polymer layer 272, film layer 276 and second polymer layer 274. The second polymer layer 274 is generally compatible with the polymer of the fiber reinforced composite panel 288 to securely bond laminate 282b to panel 288.

The nonwoven layer is formed of fibers having a density of at least 15 g/m². A polymer fiber web will typically have a density of 17-60 g/m² while a mineral fiber web will typically have a density of 25-120 g/m² or more. Generally the nonwoven is a spunbond flatbond, spunbond pointbond, spunlace, hydroentangled, needlepunched, or wet laid web although any suitable production method may be used to form the nonwoven. The fibers may be continuous fibers, staple fibers, mono or multicomponent fibers such as polyester, polypropylene, polyethylene, polyamide (nylon) and aramid fibers mineral; fibers such as glass or carbon; or natural fibers such as cellulose; as well as combinations of such fibers. The matrix polymer are typically formed of thermoplastics such as polypropylene, polyethylene, thermoplastic polyurethane, PET, polyamides (nylon), acrylic, PVC, and thermosets such as epoxy, unsaturated polyester, vinylester, BMI's, phenolics and thermoset polyurethanes.

Adhesives may be polyurethane, methacrylate, and epoxy.

The polymer layers are typically formed of polypropylene, polyethylene, polyurethane, PET, polyamides (nylon), acrylic and PVC.

Each polymer layer may incorporate additives such as colorants, opacifiers, ultra-violet stabilizers, fire retardants, and other products for processing aids or thermal stability. The distribution of additives in the layers may be tailored to reduce the load and cost of the additives and to enhance performance and appearance. The graphic printing may be used for providing a pattern for overall surface appearance effects or specific lettering and logos, or a combination of the two. The use of a discontinuous pattern may serve to improve the appearance of the final product or may be used to disguise or camouflage the surface flaws inherent in the fiber reinforced composite panel of the final product. The constituents of either polymer layer may be selected to specifically enhance the appearance of the graphically printed nonwoven substrate material as well as to protect it from environmental abuse. The laminate is typically rolled and shipped and/or stored for further processing.

The multilayer laminate facings shown are intended to be laminated to fiber reinforced composite materials to provide the composite materials with high quality surface finishing for superior appearance and environmental resistance. When the multilayer laminate facing and the fiber reinforced composite have similar thermoplastic polymers, the lamination may be by thermal processing. Alternatively, when the multilayer laminate facing provides exposed fibers on the backside, this facilitates lamination with adhesives and alternative resins to provide mechanical bonding in combination with potentially less strong chemical bonds.

In accordance with embodiments of the present invention the polymer layer(s) may be by conventional forming such as casting, blowing, and extrusion or coextrusion processes. The use of two or more polymer layers allows the selection of polymer and additives for each layer, as well as the proportional thickness of each. The multilayer laminate facing may be provided with a protective film layer laminated to the coatings. This protective film is useful for maintaining the surface finish quality during subsequent processing steps. The protective film improves the subsequent processing steps and the final surface characteristics. The film controls the surface gloss of the final product. A film of at least about 0.4 mils and preferred film thickness of 0.5-2 mils. The protective film is selected from polymers that have a higher melting temperature than of the polymer layers to assure integrity during fabrication and through subsequent lamination processes. In the event that a preformed film layer is used, a film of at least 0.4 mils and preferably 0.4-2 mils are typically used. The polymer of a preformed film will most often be of the same polymer as the coatings used on the nonwoven substrate. The protective film layer may be a low shrink polyester polymer with a matte or gloss finish and may be specified with a coating specifically adapted for moderate adhesion during processing and ease of removal after final processing. The use of a polyester film generally provides the most suitable balance of polymer adhesion, thermal stability, and tear resistance reinforced composite panel material. The resulting laminate includes two layers of polymer on the nonwoven and peel-ply film.

Various configurations and weights of the present invention have been manufactured and are shown in the attached table.

| Component | Material | Qty | Trial Number | | | | | | | | |
| --- | --- | --- | --- | --- | --- | --- | --- | --- | --- | --- | --- |
| | | | 1 | 2 | 3 | 4 | 5 | 6 | 7 | 8 | 9 |
| Peal Ply | PET Film | gsm | 26 | 26 | 26 | 26 | 26 | 26 | 26 | 26 | 26 |
| Coating | PP Exrudate | gsm | 45 | 90 | 45 | 63 | 30 | 30 | 25 | 25 | 25 |
| Coating | PP Exrudate | gsm | | | | | 40 | 80 | 80 | 65 | 65 |
| Substrate | PET Spunbond | gsm | 34 | 34 | 34 | 34 | 34 | 34 | 34 | 34 | 34 |
| Coating | PP Exrudate | gsm | 50 | 50 | 45 | 45 | | | | | |
| Total Weight | (w/Film) | gsm | 155 | 200 | 150 | 168 | 130 | 170 | 165 | 150 | 150 |
| | (w/o Film) | gsm | 129 | 174 | 124 | 142 | 104 | 144 | 139 | 124 | 124 |
| Thickness (w/o Film) | | mils | 5.0 | 6.7 | 4.8 | 5.5 | 4.0 | 5.6 | 5.4 | 4.8 | 4.8 |

| Number | FIG# | Notes |
| --- | --- | --- |
| 1 | 1A | Printed Nonwoven, Back coated then laminated with film, Pigmented White underneath, Clear Coat on top |
| 2 | 1A | Printed Nonwoven, Back coated then laminated with film, Pigmented White underneath, Clear Coat on top |
| 3 | 1A | Nonwoven Back coated then laminated with film, Pigmented White with High UV Additives, underneath and on top |
| 4 | 1A | Nonwoven Back coated then laminated with film, Pigmented White with High UV Additives, underneath and on top |
| 5 | 3A | Film coated then laminated with nonwoven, Pigmented White, successive coatings with thin top coat |
| 6 | 3B | Film coated then laminated with nonwoven, Pigmented White, successive coatings with thin top coat |
| 7 | 3B | Film coated then laminated with nonwoven, Pigmented White, successive coatings with thin top coat |
| 8 | 3B | Film coated then laminated with nonwoven, Pigmented White, successive coatings with thin top coat |
| 9 | 2B | Nonwoven Top coated then laminated with film, Pigmented White, successive coatings with thin top coat |
| 1-4 | | 1st Coating applied to Substrate (back side), 2nd Coating to Laminate with Peal Ply Film |
| 5-8 | | 1st Coating applied to Peal Ply Film, 2nd Coating to Laminate with Substrate |
| 9 | | 1st Coating applied to Substrate (top side), 2nd Coating to Laminate with Peal Ply Film |

EXAMPLES

The present invention should not be considered limited to the specific examples described herein, but rather should be understood to cover all aspects of the invention. Various modifications, equivalent processes, as well as numerous structures and devices to which the present invention may be applicable will be readily apparent to those of skill in the art. Those skilled in the art will understand that various changes may be made without departing from the scope of the invention, which is not to be considered limited to what is described in the specification.

The multilayered laminated facer generally incorporates a nonwoven with a density of at least 15 g/m$^2$, a first polymer layer of at least 0.4 mils, and typically 0.5-5.0 mils and a second polymer layer of at least 0.4 mils and typically 0.5-5.0 mils and a protective film. The multilayered laminate facer is generally thermally bonded to a structural fiber reinforced composite panel material. The resulting laminate includes two layers of polymer on the nonwoven and peel-ply film.

What is claimed is:

1. A composite material with a multilayer laminated facer, comprising:
   a fiber reinforced polymer board, including:
   a polymer matrix; and
   a plurality of reinforcing fibers dispersed within the matrix; and
   a laminated facer on the fiber reinforced board, including:
   a nonwoven having an upper surface and a lower surface;
   a first polymer layer having an upper surface and a lower surface; and
   a second polymer layer having an upper surface and a lower surface,
   wherein the interface between the first polymer layer and the second polymer layer is within the nonwoven.

2. The composite material of claim 1, wherein the first polymer layer is applied to the lower surface of the nonwoven and the second polymer layer is applied to the upper surface of the nonwoven.

3. The composite material of claim 1, further comprising: a printed layer on the upper surface of the nonwoven.

4. The composite material of claim 1, wherein a printed layer is at the interface between the first and second polymer layer.

5. The composite material of claim 1, wherein the upper surface of the nonwoven and the upper surface of the first polymer layer are substantially coplanar.

6. The composite material of claim 1, further comprising: a peel-ply protective film.

7. The composite material of claim 1, further comprising: an adhesive positioned between the laminate facer and the fiber reinforced polymer board.

8. The composite material of claim 7, wherein the lower surface of the nonwoven includes exposed fibers.

9. The composite material of claim 1, wherein the first polymer layer has a thickness of 0.5-5 mil.

10. The composite material of claim 1, wherein the second polymer layer has a thickness of 0.5-5 mil.

* * * * *